US008836783B2

(12) United States Patent
Rondinelli et al.

(10) Patent No.: US 8,836,783 B2
(45) Date of Patent: Sep. 16, 2014

(54) TELEPRESENCE USING PANORAMIC IMAGING AND DIRECTIONAL SOUND AND MOTION

(71) Applicant: EyeSee360, Inc., Pittsburgh, PA (US)

(72) Inventors: Michael Rondinelli, Canonsburg, PA (US); Anthony Stentz, Pittsburgh, PA (US); Sanjiv Singh, Pittsburgh, PA (US); Herman Herman, Gibsonia, PA (US)

(73) Assignee: EyeSee360, Inc., Pittsburgh, PA (US)

( * ) Notice: Subject to any disclaimer, the term of this patent is extended or adjusted under 35 U.S.C. 154(b) by 0 days.

(21) Appl. No.: 14/245,609

(22) Filed: Apr. 4, 2014

(65) Prior Publication Data

US 2014/0218470 A1    Aug. 7, 2014

Related U.S. Application Data

(63) Continuation of application No. 11/194,177, filed on Aug. 1, 2005, now Pat. No. 8,730,322.

(60) Provisional application No. 60/592,533, filed on Jul. 30, 2004.

(51) Int. Cl.
*H04N 11/18* (2006.01)
*H04N 5/232* (2006.01)

(52) U.S. Cl.
CPC .................................. *H04N 5/23238* (2013.01)
USPC ....................................................... 348/143

(58) Field of Classification Search
CPC .............. H04N 5/232; H04N 5/23293; H04N 7/17318; H04N 21/21805; H04N 21/4126; H04N 21/4181; H04N 21/4312; H04N 21/47202; H04N 21/6131; H04N 5/38; H04N 5/2628; H04L 67/12; G02B 13/06; G03B 37/00; G06T 3/0062; G08B 13/19628
USPC ........................................................... 348/143
See application file for complete search history.

(56) References Cited

U.S. PATENT DOCUMENTS

| | | | |
|---|---|---|---|
| 4,504,130 A | 3/1985 | Bell et al. |
| 4,760,445 A | 7/1988 | Mijiyawa |
| 4,885,878 A | 12/1989 | Wuu |
| 4,980,762 A | 12/1990 | Heeger et al. |
| RE33,559 E | 3/1991 | Fallacaro et al. |
| 5,453,011 A | 9/1995 | Feuer et al. |
| 5,765,314 A | 6/1998 | Giglio et al. |
| 5,850,352 A | 12/1998 | Moezzi et al. |
| 6,354,954 B1 | 3/2002 | Sumner |
| 6,594,448 B2 | 7/2003 | Herman et al. |
| 6,856,472 B2 | 2/2005 | Herman et al. |
| 6,934,461 B1 | 8/2005 | Strub et al. |
| 7,058,239 B2 | 6/2006 | Singh et al. |

(Continued)

*Primary Examiner* — Dave Czekaj
*Assistant Examiner* — Leron Beck
(74) *Attorney, Agent, or Firm* — Alan G. Towner, Esq.; Pietragallo Gordon Alfano Bosick & Raspanti, LLP

(57) ABSTRACT

An imaging system comprising a panoramic visual image display, an associated directional sound playback device, and an associated motion reproduction device is disclosed. The imaging system conveys visual, sound and motion information related to a particular viewing direction to provide a realistic experience for the viewer. The imaging system can also comprise a panoramic visual image recording device capable of recording panoramic images, an associated directional sound capturing device capable of recording sound, and an associated directional motion capturing device capable of recording motion. Recorded panoramic images, sound and motion can be synchronously recorded to a common time code for simultaneous playback.

17 Claims, 8 Drawing Sheets

(56) References Cited

U.S. PATENT DOCUMENTS

| | | |
|---|---|---|
| 7,123,777 B2 | 10/2006 | Rondinelli et al. |
| 7,139,440 B2 | 11/2006 | Rondinelli et al. |
| 7,399,095 B2 | 7/2008 | Rondinelli |
| 7,409,045 B2 | 8/2008 | Naidoo et al. |
| 7,486,324 B2 | 2/2009 | Driscoll, Jr. et al. |
| 7,656,428 B2 | 2/2010 | Trutna, Jr. |
| 8,319,845 B2 | 11/2012 | Ortiz |
| 2002/0075295 A1 | 6/2002 | Stentz et al. |

TELEPRESENCE USING PANORAMIC IMAGING AND DIRECTIONAL SOUND AND MOTION

CROSS REFERENCE TO RELATED APPLICATIONS

This application is a continuation of U.S. application Ser. No. 11/194,177 filed Aug. 1, 2005, which claims the benefit of U.S. Provisional Application Ser. No. 60/592,533 filed Jul. 30, 2004, both of which are incorporated herein by reference.

FIELD OF THE INVENTION

The present invention relates to panoramic imaging, and more particularly relates to the use of panoramic visual images in combination with directional sound and motion to provide an immersive imaging experience.

BACKGROUND INFORMATION

Panoramic imagery is able to capture a large azimuth view with a significant elevation angle. In some cases, the view is achieved through the use of wide angle optics such as fish-eye lens. This view may be expanded by combining or "stitching" a series of images from one or more cameras with overlapping fields of view into one continuous view. In other cases it is achieved through the use of a combination of mirrors and lens. Alternatively, the view may be developed by rotating an imaging sensor so as to achieve a panorama. The panoramic view can be composed of still images or, in cases where the images are taken at high frequencies, the sequence can be interpreted as animation. Wide angles associated with panoramic imagery can cause the image to appear warped, i.e., the image does not correspond to a natural human view. This imagery can be unwarped by various means including software to display a natural view.

While systems have been proposed in which panoramic images can be created in computer generated environments, such as with three-dimensional models, a need remains for an imaging system in which still or video panoramic imagery is combined with directional sound and directional motion to provide realistic telepresence.

SUMMARY OF THE INVENTION

The present imaging system conveys not only visual information but also audio information and motion information related to a particular viewing direction to improve the realism to the viewer on playback. The imaging system comprises a panoramic visual image display, an associated directional sound playback device, and an associated motion reproduction device. The imaging system can also comprise a panoramic visual image recording device capable of recording panoramic images, an associated directional sound capturing device capable of recording sound, and an associated directional motion capturing device capable of recording motion.

An aspect of the present invention is to provide an apparatus comprising: a panoramic visual image capturing device capable of recording panoramic visual images; and a motion capturing device capable of recording motion of the panoramic visual image capturing device to produce captured motion data that can be synchronized with the panoramic visual images captured by the panoramic visual image capturing device, and can be associated with a particular image view corresponding to only a portion of the panoramic visual images.

Another aspect of the present invention is to provide a method comprising the steps of: recording panoramic visual images; recording motion of the panoramic visual image capturing device to produce captured motion data; and synchronizing the captured motion data with the panoramic visual images captured by the panoramic visual image capturing device, wherein the captured motion data can be associated with a particular image view corresponding to only a portion of the panoramic visual images.

These and other aspects of the present invention will be more apparent from the following description.

DETAILED DESCRIPTION

The present invention combines panoramic visual images, directional sound, and directional motion. Panoramic visual images can comprise one or more individual still images, or a sequence of images such as a video stream. The present invention provides that sound recorded with at least one sound capturing device and motion recorded with at least one motion capturing device can be heard and felt in conjunction with visual panoramic images recorded with a panoramic visual image recording device during playback. Directional sound and directional motion can be associated with a particular view of visual images during playback to convey a realistic experience to the viewer.

As used herein, the term "panoramic visual images" means wide angle images taken from a field of view of from greater than 180° to 360°, such as from about 270° to 360°. In a particular embodiment, the field of view is up to 360° around a principal axis, which is often orientated to provide a 360° horizontal field of view. In this embodiment, a secondary axis may be defined, e.g., a vertical field of view. Such a vertical field of view may typically range from 0.1° to 180°, for example, from 1° to 160°. In accordance with the present invention, sections of the panoramic visual images may be selectively viewed. For example, while the panoramic visual images may comprise up to a 360° field of view, a smaller section may be selectively displayed, e.g., a field from about 1° to about 60° may be selectively viewed.

An embodiment of the present invention provides an imaging system including a panoramic visual image display, an associated directional sound playback device, and an associated directional motion reproduction device. As used herein, the term "associated directional sound" means sound corresponding to a particular image view. As used herein, the term "associated directional motion" means motion corresponding to a particular image view.

Figure 1:
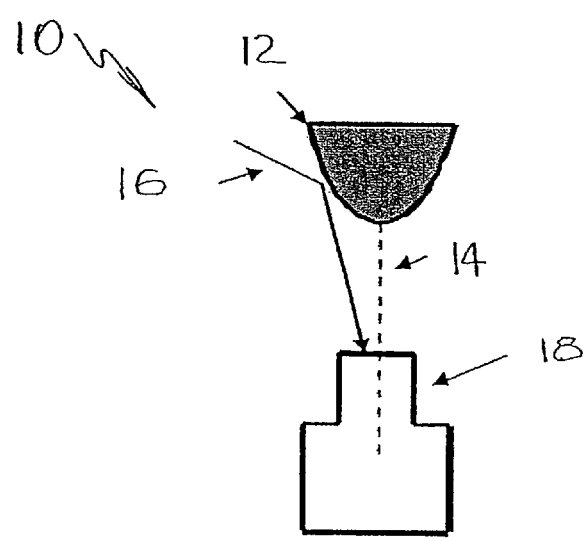
FIG. 1 is a schematic diagram illustrating a system for producing panoramic images in accordance with the invention.

FIG. 1 is a schematic diagram illustrating a system 10 for producing panoramic visual images. A mirror 12 having optical axis 14 gathers light 16 from all directions and redirects it to a camera 18. A camera and panoramic mirror arrangement as shown in FIG. 1, or any other suitable panoramic imaging device, may be used to capture the panoramic visual images.

Figure 2:
FIG. 2 is a raw image from a panospheric camera in accordance with the invention.
Figure 3:
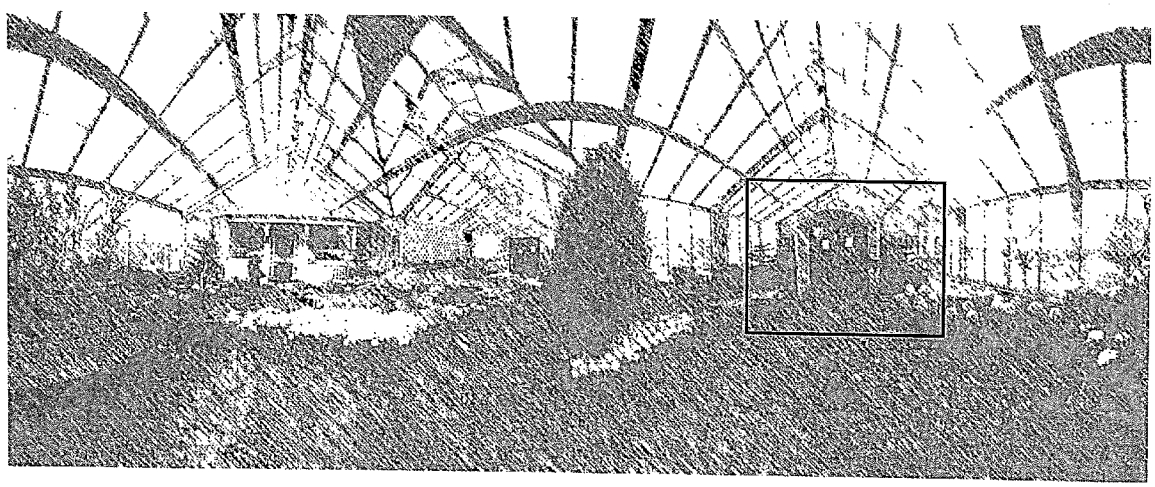
FIG. 3 is the image from FIG. 2 displayed as a rectangular image using a projection onto a cylindrical surface in accordance with the invention.

FIG. 2 is a raw image from a panospheric camera. FIG. 3 is the image from FIG. 2 displayed as a rectangular image using a projection onto a cylindrical surface. A viewer can select any part of this image to examine, e.g., as shown in the framed region. Each panoramic image may display a full 360° view from a point or set of points. These images may be produced by any suitable type of panoramic camera, and may be viewed using any suitable projection, such as perspective, cylindrical and/or spherical, on a panoramic visual image display device such as television screens or computer monitors. At any given time, only part of the image may be displayed to the user, based on commands given to the system.

Figure 4A:
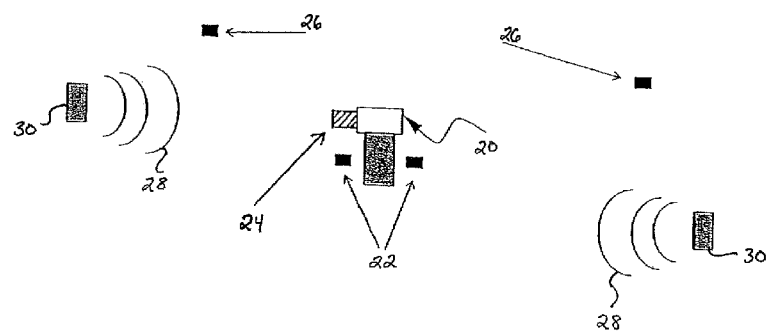
FIG. 4A is a schematic illustration of an imaging system comprising a panoramic camera with multiple microphones which are used to record sound from one or more sound sources and a gyroscopic motion sensor which is used to record motion in one or more directions in accordance with the invention.

Sound and motion may be recorded simultaneously with the panoramic visual imagery. As shown in FIG. 4A, a panoramic visual image recording device 20 may be coupled with two or more associated sound capturing devices 22 and at least one associated motion capturing device 24. The sound capturing devices 22 may be located adjacent to the panoramic visual image recording device 20, and/or may be located remotely from the panoramic visual image recording device 20. Additional sound capturing devices 26 may also be positioned remotely from the panoramic visual image recording device 20. Likewise, the associated motion capturing device 24 may be located adjacent the panoramic visual image recording device 20, or may be located remotely from the panoramic visual image recording device 20. The audio recordings received from the associated sound capturing devices 22 and/or 26 and the captured motion data of the associated motion capturing devices 24 may be synchronized with panoramic images captured by the panoramic visual image recording device 20.

As the panoramic visual image recording device 20 collects panoramic images, sound waves 28 produced from various sources of sound 30, may also be captured by the associated sound capturing devices 22 and the motion captured by the associated motion capturing device(s) 24. The location of the corresponding source of the sound and motion may be computed. As the view of the panoramic visual image is changed by a computer utilizing a pre-determined program, or by the user manipulating a haptic device such as a joystick, the audio playback and motion simulation reproduction is altered such that the user is able to perceive the direction of the source of sound and the direction of the motion.

An associated sound capturing device may be used to capture sound on two or more channels, and a temporal and spatial correspondence may be established between the panoramic visual image and the associated sound. Example associated sound capturing devices include microphones and the like.

Sound can be captured, for example, by any number of microphones each of which might be substantially uni-directional or omni-directional. As used herein, the term "uni-directional" means sound is captured within a cone oriented substantially in a single direction. As used herein, the term "omni-directional" means sound is captured from all directions. Omni-directional microphones may be approximated by the use of several directional microphones placed in a ring. Sound may also be recorded separately, and an artificial coupling may be made between the panoramic visual image and the associated sound. In another embodiment, either the panoramic visual image and/or the associated sound are synthetic. In this embodiment, artificial panoramas created by computer models can be used in place of a real panoramic visual image and artificial sources of sound, such as computer generated sound, may be used. In another embodiment, a different sound that has been recorded separately may be associated with the panoramic visual image. Sound may be captured by a single sound capturing device or a series of sound capturing devices placed in an environment being captured by a panoramic visual image recording device, such as, for example, a moving automobile.

The sources of sound may be point sources, such as a singer on a stage, or a diffuse source, such as an applauding audience. The spatial correspondence between the panoramic images and sound can be achieved by localizing the sources of sound and embedding the localized information in a data stream that contains both panoramic image data and sound data. The method for localizing the sources of sound may include measuring both the loudness and phase of the sound. From these measurements, an estimate of the location of the sources can be computed. If the panoramic images are generated using a rotating device, one rotating sound capturing device can also be used to simulate two or more stationary sound capturing devices.

Likewise, an associated motion capturing device may be used to capture motion, and a temporal and spatial correspondence may be established between the panoramic visual image and the associated motion. Example motion capturing devices include gyroscopic motion sensors and the like. The motion captured can include linear velocity, rotational velocity, acceleration, pitch, or yaw sensed from an observation point with respect to a scene in the panoramic visual image. In one embodiment, the motion capturing device can comprise multiple gyroscopic motion sensors. In another embodiment, the motion capturing device can comprise a single three-dimensional gyroscopic motion sensor.

Motion can be captured, for example, by any number of motion capturing devices each of which may be placed throughout an environment being captured by a panoramic visual image recording device, such as in a moving automobile. The motion capturing device may be capable of sensing independent motion in different areas of the environment. Motion may also be recorded separately, and an artificial coupling may be made between the panoramic visual image and the motion. In another embodiment, the panoramic visual image and/or the motion are synthetic. An artificial panoramic visual image created by a computer model can be used in place of a real panoramic visual image and an artificial source of motion, such as computer generated motion, can be used. In another embodiment, a different motion that has been recorded or reproduced separately may be associated with the panoramic visual image.

Figure 4B:
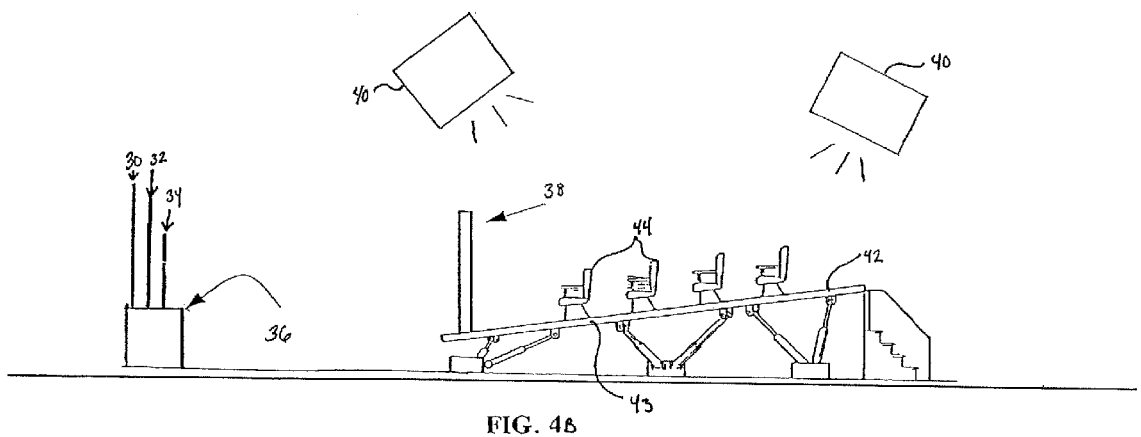
FIG. 4B is a schematic illustration of an image playback system comprising a panoramic visual image display, an associated sound playback device, and an associated motion reproduction device in accordance with the invention.
Figure 4C:
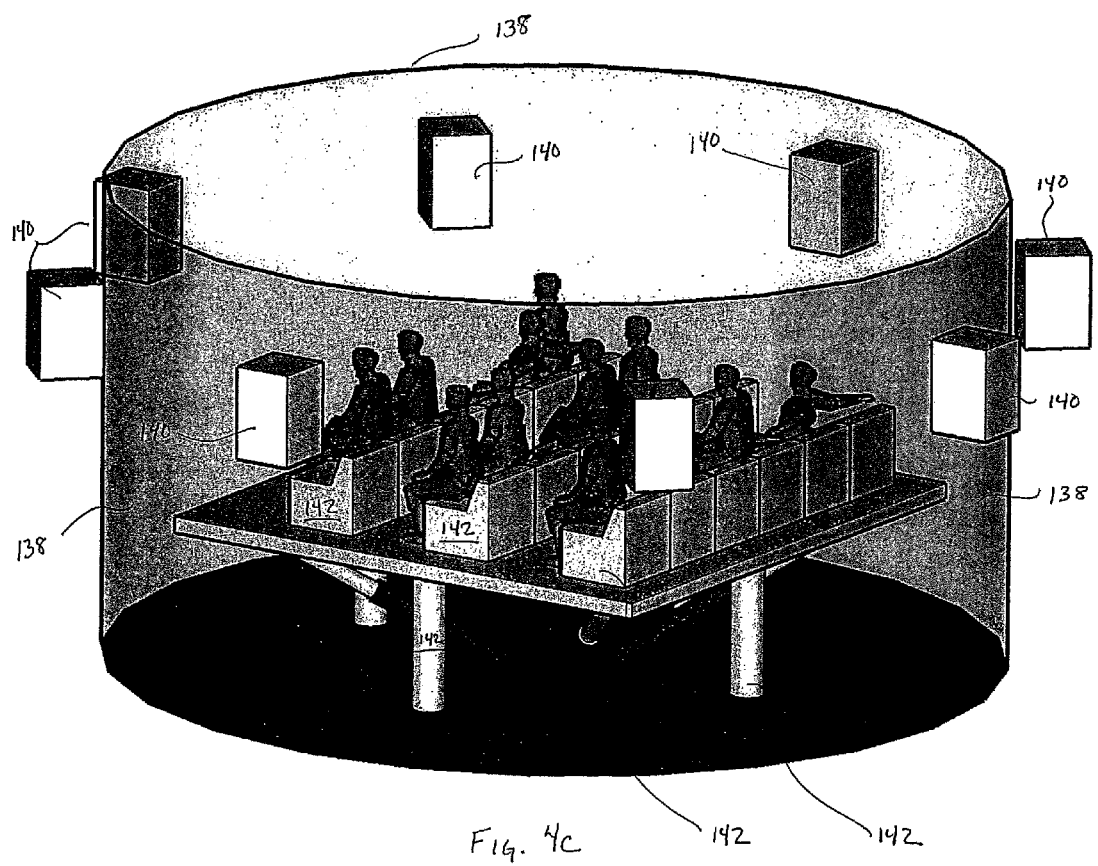
FIG. 4C is a schematic illustration of an image playback system comprising a panoramic visual image display, an associated sound playback device, and an associated motion reproduction device in accordance with the invention.

Panoramic visual images, associated directional sound and associated motion captured as described above can be synchronously reproduced to a viewer. As shown in FIGS. 4B and 4C, various systems can be constructed to reproduce the panoramic visual images, associated sound and associated motion. As shown in FIG. 4B, recorded panoramic visual images 30, recorded associated sound 32 and recorded associated motion 34 are transmitted to a processing unit 36, such as a computer, to transmit the recorded visual images, sound and motion to an appropriate playback device. The recorded panoramic visual images 30 are transmitted to a panoramic visual image display 38 and displayed to a viewer. Examples of panoramic visual image displays 38 may include various types of computer monitors, televisions, video projection systems, head mounted displays, holograms and the like. As shown in FIG. 4C, the panoramic visual image display 138 can comprise a curved screen, such as a screen that partially or fully surrounds a viewer. The panoramic visual image display may comprise a single display device, or multiple display devices such as a row or array of devices. As shown in FIG. 4B, the recorded associated sound 32 is transmitted to an associated directional sound playback device or devices 40 and projected to a viewer. Examples of associated directional sound playback devices 40 may include one or more speakers driven by any suitable power source such as one or more amplifiers. As shown in FIG. 4C, associated directional sound playback devices 140 can be positioned at various locations around a viewer, such as at four ordinal directions or mounted in association with a visual image display 138. As shown in FIG. 4B, the recorded associated motion 34 is transmitted to an associated directional motion reproduction device 42. Examples of associated directional motion reproduction devices 42 may include platforms 43 or chairs 44 containing hydraulic and other mechanical actuators that may be controlled by a computer or other suitable device to simulate motion. These motion reproduction devices 42 may be located in proximity to a panoramic visual image display 38 and/or an associated sound playback device or devices 40. As shown in FIG. 4C, the associated motion reproduction device(s) 142 may also be an integral unit with a panoramic visual image display 138 and/or one or more associated sound reproduction devices 140. In one embodiment, a user may be physically located in or on the associated motion reproduction device 142, such as sitting in a chair or standing on a platform.

In one embodiment of the invention, panoramic image video, directional sound and measurements of the dynamics of motion may all be recorded over time and synchronized to a common time code. In this embodiment, a common time code may be generated by a device and stamped on the digital samples produced by the panoramic visual image recording device, the associated sound capturing device and the associated motion capturing device. This information may be digitally encoded and stored on a computer memory device, digital tape deck, or other suitable recording media.

One possible system for capture of these samples will collect input respectively from the panoramic visual image capturing device, the sound capturing device and the motion capturing device into a common recording system. Data from each subsystem will be assembled into samples of a fixed duration and delivered periodically to the recording system. Each data stream may maintain an independent sampling rate appropriate for the media, such as, for example, 30 frames per second of imagery or video, 44,100 sound samples per second, and 100 samples per second of motion data. The sampling rate may be pre-determined for a given recording session and can be held constant while a recording is in-progress.

In one embodiment, each of the subsystems will be constrained to operate in "real-time", meaning they capture their respective data and deliver it to the recording system on a real-time basis with a consistent latency, or time offset between the moment of record and the moment the data is received by the recording system. By maintaining a predetermined, calibrated, or calculated latency from each data stream, data received from each stream can be tagged with a time stamp. The time stamp can be determined by an internal or external clock mechanism that is part of the recording system. A sample from a particular data stream can be stamped with the current clock time as shown in Equation 1, where the time stamp out is equal to the time input minus the corresponding stream latency.

$$T[\text{out}] = T[\text{in}] - L[\text{stream}] \qquad \text{Equation 1}$$

Accordingly, samples from each data stream may be synchronized with each other within a particular error range. In a basic system, the maximum error can correspond to the longest sampling interval of any individual data stream, for example, 1/30th of a second. For better synchronization, the disparate recording systems can be triggered to record their samples based on a common signaling device, commonly known as a "genlock" in video production. This will allow arbitrarily small error ranges for captured samples.

When the recording is played back, the time code may be used to reassemble the various panoramic video, sound and motion elements in their original order and similitude, resulting in an accurate model of the recorded environment. Recorded data can be played through a playback computer system 36, for example as shown in FIG. 4B. The playback system may have output devices for a video stream, multi-channel audio and motion control. The playback system transmits data to these output devices by transmitting samples over individual output streams, each operating in real-time at a pre-determined sampling rate with a known latency. As an image or video stream is played, the playback system is signaled by an internal or external clock offset to correspond to the time stamps recorded in the data stream. The clock may progress in "real-time", for example 1 second:1 second rate, or it may progress at an arbitrary scale factor of this rate for slow motion or fast playback purposes. The clock may also be triggered momentarily at a given moment in time corresponding to a time in the recorded data set. This can be useful for pause or search capabilities.

Regardless of the mode of operation, to play back at a given time index the playback system will determine the sample time to output as shown in Equation 2 where the time out is based on the clock time minus the maximum system latency plus the latency of the stream.

$$T[\text{out}] = T[\text{in}] - L[\text{max}] + L[\text{stream}] \qquad \text{Equation 2}$$

The output system may also use a queue mechanism to schedule samples to be output at a certain time in the future. The underlying operating system of the playback computer offers scheduling primitives to execute the output of the stream at the indicated time. Using such real-time facilities of the host system or media architecture are preferred to ensure better performance and timely delivery of data.

In one embodiment, the recorded data stream can provide a self-contained synchronized stream of panoramic video, sound and motion display, such that it is possible for the viewer(s) of such a system to have a degree of control over their experience. Specifically, the viewer(s) may control their viewing direction and field-of-view or zoom interactively by using an input device such as a mouse, trackball, joystick, or gyroscope. In response to such input, the synchronized data streams can adjust to the new viewing parameters dynamically, panning the video along with sound and adjusting the motion data appropriately.

In another embodiment, the digitally recorded panoramic image video, sound and motion data may be transmitted from devices capable of recording this information directly to a playback device, such as a driving simulator or a flight simulator. In another embodiment, this digitally recorded data may be temporarily stored in an intermediate storage device prior to being sent to such a simulator device for the purpose of creating a time delay.

Figure 5:
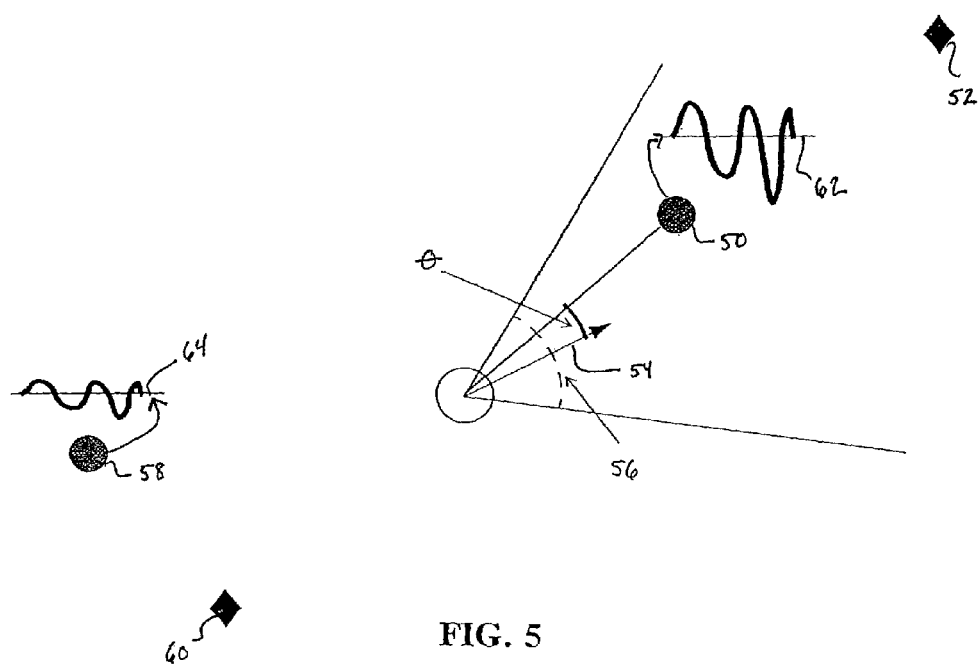
FIG. 5 is a schematic illustration of the strength of a sound from a particular sound source with respect to the current viewing direction in accordance with the invention.

FIG. 5 schematically illustrates how the loudness of a sound from a particular sound source and the type of motion that is reproduced depends upon its location with respect to the current viewing direction of the panoramic visual image. The sound source 50 and motion source 52 appears to come slightly from the left given the viewing direction 54 and the field of view 56 shown. As the viewing direction changes, the strength of the sound and the various motion parameters reproduced, such as forces and accelerations, can be made to vary as a function of the angle between the viewing direction and the direction to the source of the sound and the motion. For the apparent angle θ, which can be defined as the angle between the viewing direction and the direction to the source of the sound and the motion, one such function may be proportional to $\cos(\theta/2)$.

In FIG. 5, for example, if panoramic image video, sound and motion were being recorded in a moving automobile, sound source 50 and motion source 52 might represent sounds and motion associated with the viewer looking out of the front of the automobile, and second sound source 58 and second motion source 60 may be associated with the directional sounds and motion associated with the viewer looking out of the rear of the automobile. In this example, if the viewer is looking out of the front of the automobile, indicated in FIG. 5 as the current viewing direction, and the car is traveling uphill, sound source 50 may project loud sound signals 62, such as sounds in front of the car, whereas sound source 58 may project faint sound signals 64. Given the current viewing direction, motion source 52 may be indicative of the viewer being tilted backwards as the car climbs the hill. Likewise, if the viewing direction were changed so as to be pointing towards sound source 58 and motion source 60, representing the viewer turned 180° and looking out of the back of the car, sound source 58 may become loud while sound source 50 will become faint, and motion source 60 would be indicative of the viewer being tilted downwards, indicating the car is still traveling uphill.

If the source of the sound and motion parameters, such as velocity or direction, remains constant, the user may be able to sense the unvarying direction of the sound and motion as the viewing direction is changed. Alternatively, if the direction of the source of sound and motion is changing, the user may be able to sense the direction of the moving source as the selected view of the panoramic imagery is changed. One or more sound reproduction devices may be used to play back the associated sound and at least one motion reproducing device may be used to reproduce the associated motion.

If there is only one associated sound reproduction device, the loudness of the sound may be modulated according to the alignment of the sound source with respect to the current viewing angle. The viewing angle may be chosen by a user, may be pre-determined, or may be automatically varied as a user "looks" around a scene. If multiple associated sound reproduction devices are used for playing back the sound, the sound played back from the sound reproduction devices may be modulated so as to provide the listener with the feedback.

Figure 6:
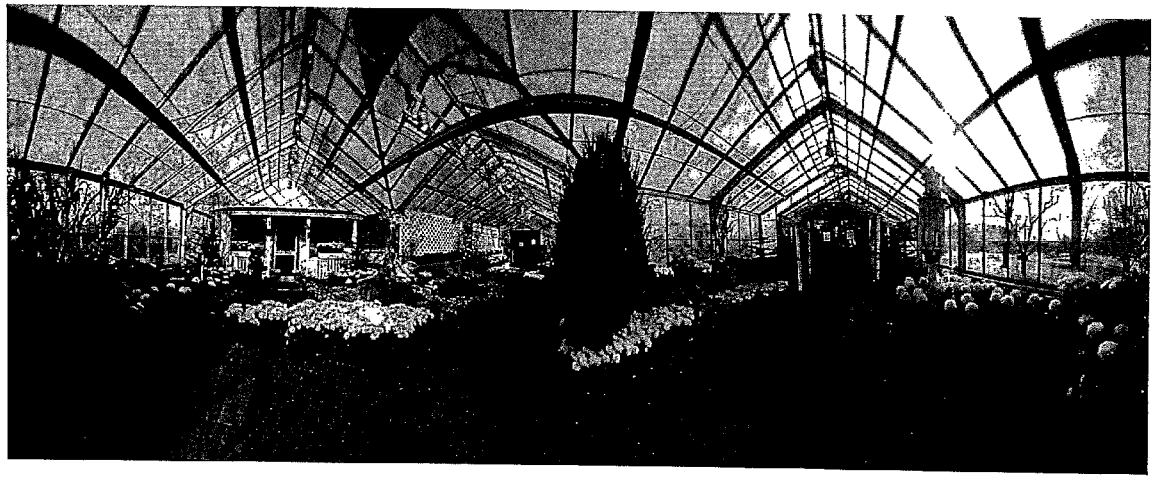
FIG. 6 is the rectangular projected image of FIG. 3, illustrating an angle between the viewing direction and the reference frame of a camera in accordance with the invention.

FIG. 6 is the rectangular projected image of FIG. 3, illustrating an angle between the viewing direction (the center of the selected view) and the reference frame of the camera. Each row of the image, such as rows of pixel data, spans 180°. If the viewing direction points to the location of the sound and motion source, then the sound will be at its loudest and the motion from that particular direction will be reproduced. If the sound originates 180° from the viewing direction, the sound will be at its faintest and the motion from this new viewing direction will be reproduced.

If there is more than one sound reproduction device, the phase and loudness of the sound on the sound reproduction devices may be modulated to emulate the position of the sound source with respect to the current viewing direction. Although there may be no depth information from the camera, the amount of zoom selected by the user could be interpreted as a depth cue to select the sound balance between the two sound capturing devices. Likewise, the amount of zoom selected by the user could be interpreted as a cue to select the mix of motion reproduced between the motion capturing devices. The zoom could also be used to alter the loudness of the sound so as to correspond with the experience of getting closer or farther away from the source of the sound. Thus, sound and motion may be recreated as coming from a direction without knowing its exact position.

Figure 7:
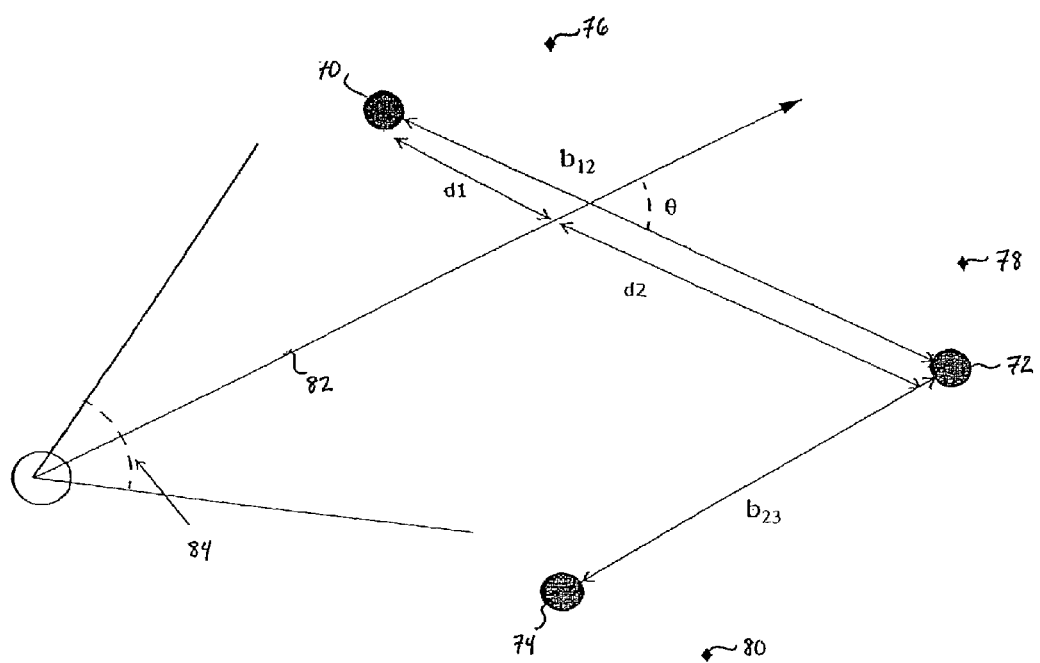
FIG. 7 is a schematic illustration of an imaging system where sound and motion that is recreated when microphones and motion sensors are not at the optical center of a panoramic device in accordance with the invention.

If the directional sound capturing devices and motion capturing devices are not at the optical center of the panoramic visual image recording device, using the angular difference between the viewing direction and the sound capturing device direction and motion capturing device direction may not be sufficient. For example, three omni-directional microphones 70, 72 and 74 and three gyroscopic motion sensors 76, 78 and 80 can be placed in an environment as illustrated in FIG. 7. A distance can be recreated by modulating the sound from the two microphones and mixing the appropriate amount of motion from the two gyroscopic motion sensors as a function of the angular difference between the viewing direction 82 of the field of view 84 and the axis of the microphone and gyroscopic motion sensor base line. In FIG. 7, $b_{12}$ is the base line distance between microphones 70 and 72 and gyroscopic motion sensors 76 and 78, while $b_{23}$ is the distance between microphones 72 and 74 and gyroscopic motion sensors 78 and 80. The angle θ is the angle between the baseline and the viewing direction 82.

Only those microphones and gyroscopic motion sensors that fall in the field of view may be used to recreate the sound and motion. In the embodiment shown in FIG. 7, microphones 70 and 72 and gyroscopic motion sensors 76 and 78 are used while microphone 74 and gyroscopic motion sensor 80 are not used. If the field of view 84 were to rotate clockwise, microphone 70 and gyroscopic motion sensor 76 may not be used but microphones 72 and 74 and gyroscopic motion sensors 78 and 80 would be used. The sound and motion is compiled based on combinations of the sound recorded at two microphones and the motion captured at two gyroscopic motion sensors. This may be determined for every pair of microphones and every pair of gyroscopic motion sensors in the viewing area.

The strengths of the sounds from the microphones and the recorded motion from the gyroscopic motion sensors may be combined as follows. The relative strength of the signal of microphone i is determined by Equation 3, $$(b_{ij} - d_i)/b_{ij} \qquad \text{Equation 3}$$

where $b_{ij}$ is the baseline distance between microphones i and j and $d_i$ is the distance between the microphone i and the intersection of the axis of the viewing direction and $b_{ij}$. The effect of direction (the offset θ) may be computed as illustrated in FIG. 5. The magnitudes of the various motion parameters captured by the gyroscopic motion sensors may also be combined in a similar manner.

In one embodiment of the invention, one panoramic camera may be used in conjunction with multiple microphones and motion capturing devices. The microphones may have directionality, i.e., they are sensitive to sounds coming from the direction that they are pointed, with sensitivity falling off in other directions, and the motion capturing devices may also have directionality, i.e., they are sensitive to motion coming from the particular location they are placed, with the sensitivity falling off in other directions. The microphones and motion capturing devices may have overlapping fields of sensitivity. Any sound and/or motion in the environment may be detected by at least two microphones and by at least two motion capturing devices.

In another embodiment, any sound and/or motion in the environment may be detected by at least two microphones and a single three-dimensional motion capturing device. Sound and motion from the environment, sensed from an observation point in the scene, is recorded simultaneously with the panoramic image video and may be correlated to the video for direct transmission or playback. The camera may have a natural frame of reference and sounds and motion parameters may be located either by position or direction (or both) with respect to the frame of reference. When the panoramic images are unwarped, the direction that the viewer chooses defines the offset from the camera reference frame. This offset may change dynamically with the selected view. The signal recorded from each sound capturing device and sensed and captured from each motion capturing device may be played back in a modified manner based on the offset from the panoramic visual image capturing device reference frame. For example, sound from each microphone and motion from each gyroscopic sensor may be combined depending on the total number of respective playback devices. This may be particularly important for audio reproduction, e.g., if only one speaker is available, then the sounds recorded from all microphones may be simply added up.

If the offset between the direction of the microphone i and the camera reference is denoted by $\theta_i$ the strength of the signal associated with that microphone, $M_i$, is $\cos(\theta_i)+\epsilon$, where $\epsilon$ is a minimal level of sound playback. The composite sound is created determined by Equation 4:

$$\Sigma(\cos(\theta_i)+\epsilon)\cdot M_i \qquad \text{Equation 4}$$

If the playback device consists of multiple speakers, the sound may be distributed to each speaker such that each speaker only plays the sounds corresponding to microphones pointed in a certain sector. For example, if four speakers are used, each speaker may only play sounds attributed to microphones in a 90° sector.

If the offset between the direction of the motion capturing device j in the camera reference is denoted by $\theta_j$, the strength of the signal associated with that motion capturing device, $D_j$, is $\cos(\theta_j)+\alpha$, where $\alpha$ is a minimal level of motion reproduction. The composite motion is created according to Equation 5:

$$\Sigma(\cos(\theta_j)+\alpha)\cdot D_j \qquad \text{Equation 5}$$

If the motion reproduction device includes multiple parts, such as multiple hydraulic or other mechanical actuators all attached to a platform or a chair, the motion may be distributed to each hydraulic actuator such that each actuator only reproduces the motion corresponding to a motion capturing device located in a certain sector. For example, if four hydraulic actuators are used, each actuator may only react to motion attributed to one or more motion capturing devices in a 90° sector.

For playback of data streams involving motion control, it may be undesirable to allow arbitrary motion paths to be executed on the motion control device. "Arbitrary paths" may be considered raw motion capture streams that have not been filtered to within safe tolerances, or it may be related to playing back sample data at a rate other than 1.0. For instance, pausing a stream at an excessive incline and playing back at fast rates that could induce unacceptable rates of acceleration may present dangerous conditions for the viewer(s). For these reasons, recorded motion can be filtered through a safety protocol.

The safety protocol ensures that motion control instructions do not exceed pre-defined safety limits for the safety of participants. These requirements can be specified for each output motion axis as a maximum range of motion, maximum velocity, and/or maximum acceleration. When a control signal meets or exceeds any of these maximum values, the signal can be modified to comply with the acceptable safety limits. This may be accomplished through truncation (a stop or slowing motion before the maximum value is exceeded), attenuation (dampening or scaling motion such that the total range of motion over time never exceeds a maximum limit), or override (the issuing of false motion or rejecting commands to ensure smooth continuity of motion). In one embodiment, the safety protocol can run in two passes. A first pre-playback pass can scan the entire set of motion control samples in a recording, and perform the necessary filtering to ensure compliance of the stream. This allows for motion more consistent with the recorded intent. The second pre-issue pass will filter motion control statements before they are executed by the motion control device. In theory, no signals should be issued that exceed safety protocols because of the first pass, however, the second pass ensures a final protection in case of first pass failure or signaling errors.

The nature of the panoramic video, sound and motion capture devices along with the synchronized recording system makes it possible for live playback of a data stream. This means that as an event is recorded in one area, it can be encoded and transmitted to a remote playback device for immediate playback. For example, capture devices mounted inside of a racecar vehicle can transmit data live to a playback system located elsewhere. Participants can ride as a passenger as a racecar is driven at another location. The safety protocols will ensure motion capture data will be attenuated to safe levels.

Whereas particular embodiments of this invention have been described above for purposes of illustration, it will be evident to those skilled in the art that numerous variations of the details of the present invention may be made without departing from the invention as defined.

What is claimed is:

1. An apparatus comprising:
a panoramic visual image capturing device capable of recording panoramic visual images; and
a motion capturing device capable of recording motion of the panoramic visual image capturing device to produce captured motion data that can be synchronized with the panoramic visual images captured by the panoramic visual image capturing device, and can be associated with a particular image view corresponding to only a portion of the panoramic visual images.

2. The apparatus of claim 1, wherein the motion capturing device comprises a gyroscopic motion sensor.

3. The apparatus of claim 1, wherein the motion capturing device captures linear velocity.

4. The apparatus of claim 1, wherein the motion capturing device captures rotational velocity.

5. The apparatus of claim 1, wherein the motion capturing device captures acceleration.

6. The apparatus of claim 1, wherein the motion capturing device captures pitch and/or yaw.

7. The apparatus of claim 1, further comprising at least one additional motion capturing device positioned remotely from the panoramic visual image capturing device.

8. The apparatus of claim 1, further comprising a sound capturing device capable of recording sound associated with viewing directions for the panoramic visual images.

9. The apparatus of claim 8, further comprising at least one additional sound capturing device positioned remotely from the panoramic visual image capturing device.

10. The apparatus of claim 8, further comprising a processor for processing signals from the sound capturing device and the motion capturing device to determine a location of a source of sound and motion.

11. A method comprising the steps of:
    recording panoramic visual images;
    recording motion of the panoramic visual image capturing device to produce captured motion data; and
    synchronizing the captured motion data with the panoramic visual images captured by the panoramic visual image capturing device, wherein the captured motion data can be associated with a particular image view corresponding to only a portion of the panoramic visual images.

12. The method of claim 11, wherein the motion of the panoramic visual image capturing device is captured with a gyroscopic motion sensor.

13. The method of claim 11, wherein the recorded motion comprises linear velocity of the panoramic image capturing device.

14. The method of claim 11, wherein the recorded motion comprises rotational velocity of the panoramic image capturing device.

15. The method of claim 11, wherein the recorded motion comprises acceleration of the panoramic image capturing device.

16. The method of claim 11, wherein the recorded motion comprises pitch and/or yaw of the panoramic image capturing device.

17. The method of claim 11, further comprising recording sound associated with viewing directions for the panoramic visual images.

* * * * *